United States Patent [19]

De Luca

[11] 3,814,869

[45] June 4, 1974

[54] OUTGOING TRUNK EXTENDER TEST AND MONITOR APPARATUS FOR CENTRAL TELEPHONE EQUIPMENT

[75] Inventor: Paul V. De Luca, Port Washington, N.Y.

[73] Assignee: Porta Systems Corp., Syosset, N.Y.

[22] Filed: Oct. 13, 1971

[21] Appl. No.: 188,723

[52] U.S. Cl. .......................... 179/175, 179/175.3 R

[51] Int. Cl. .......................... H04b 3/46, H04m 3/00

[58] Field of Search ........ 179/175.1 R, 175, 175.11, 179/175.3, 1 SW, 1 B

[56] References Cited

UNITED STATES PATENTS

| | | | |
|---|---|---|---|
| 966,728 | 8/1910 | Adams | 179/175 |
| 1,746,646 | 2/1930 | Gann et al. | 179/1 B |
| 2,158,630 | 5/1939 | Lloyd | 179/175 |
| 2,561,426 | 7/1951 | Stearn et al. | 179/98 |
| 2,806,995 | 9/1957 | Meanley | 179/175 |
| 3,699,284 | 10/1972 | Anderson | 179/175.1 R |
| 3,736,388 | 5/1973 | Thompson et al. | 179/175 |

OTHER PUBLICATIONS

International Data Sciences, Inc., Model 50, Data Interface Access Panel, 6/23/71.

*Primary Examiner*—Kathleen H. Claffy
*Assistant Examiner*—Douglas W. Olms
*Attorney, Agent, or Firm*—Phillip D. Amins

[57] ABSTRACT

An outgoing trunk (OGT) extender test and monitor apparatus for central telephone equipment, preferably of the panel and crossbar system types, for use in conjunction with the outgoing trunk test frame or board of said system, said apparatus comprising a trunk jack panel and a trunk test cabinet, means for connecting a plurality of outgoing trunks at the OGT test frame to jack terminals on the trunk jack panel, means for connecting the trunk jack panel to the trunk test cabinet disposed at a position remote from the OGT test board, and the trunk test cabinet including means for testing the operating condition of the OGTs and, in particular, for the testing of new trunks and for the clearing of defective tandem, panel and crossbar trunk pairs.

13 Claims, 4 Drawing Figures

INVENTOR.
PAUL V. DeLUCA

BY Philip D. Amins
ATTORNEY

INVENTOR.
PAUL V. DeLUCA

BY Philip D. Amins

ATTORNEY

OUTGOING TRUNK EXTENDER TEST AND MONITOR APPARATUS FOR CENTRAL TELEPHONE EQUIPMENT

BACKGROUND OF THE INVENTION

The present invention pertains to a new and novel OGT extender apparatus which will permit the test of outgoing trunks at the OGT test board without requiring the person who is performing the testing procedures to be actually positioned at the OGT board. Thus, at the present time when demand for telephone service is increasing at an alarming rate and where the physical space requirements for performing the necessary and requisite testing procedures for outgoing trunks at the OGT board is limited, it is necessary to provide new systems and procedures for accomplishing the same within a relatively short time period and with provision for checking any one of a large plurality of the trunks with minimum effort.

SUMMARY OF THE INVENTION

Accordingly, it is the primary object of the present invention to provide a new and novel OGT extender test and monitoring apparatus which is operative in conjunction with OGT test frames or boards but at physical locations which are remote from the test boards themselves.

It is another object of the present invention to provide an OGT extender apparatus of the type described which includes a trunk jack panel adapted to be mounted on or near the OGT test board and a trunk test cabinet which is adapted to be positioned remotely of the test board.

It is still a further object of the present invention to provide an OGT extender apparatus of the aforementioned type which is portable and which reduces the testing load of trunks at the OGT board.

It is still a further object of the present invention to provide an OGT extender apparatus as described which can accommodate a relatively large number of trunks so as to facilitate the testing of new trunks while permitting for relatively easy clearing of defective tandem, panel and crossbar trunk pairs.

It is still another object of the present invention to provide an OGT extender apparatus which permits a substantially large number of trunks to be multipled (electrically extended) from their OGT jack appearance to a remote test position.

BRIEF DESCRIPTION OF THE DRAWINGS

The foregoing and other objects, features and advantages of the present invention will become more apparent from the detailed description hereinafter considered in conjunction with the accompanying drawings wherein.

DETAILED DESCRIPTION OF THE PREFERRED EMBODIMENT

Figure 1:
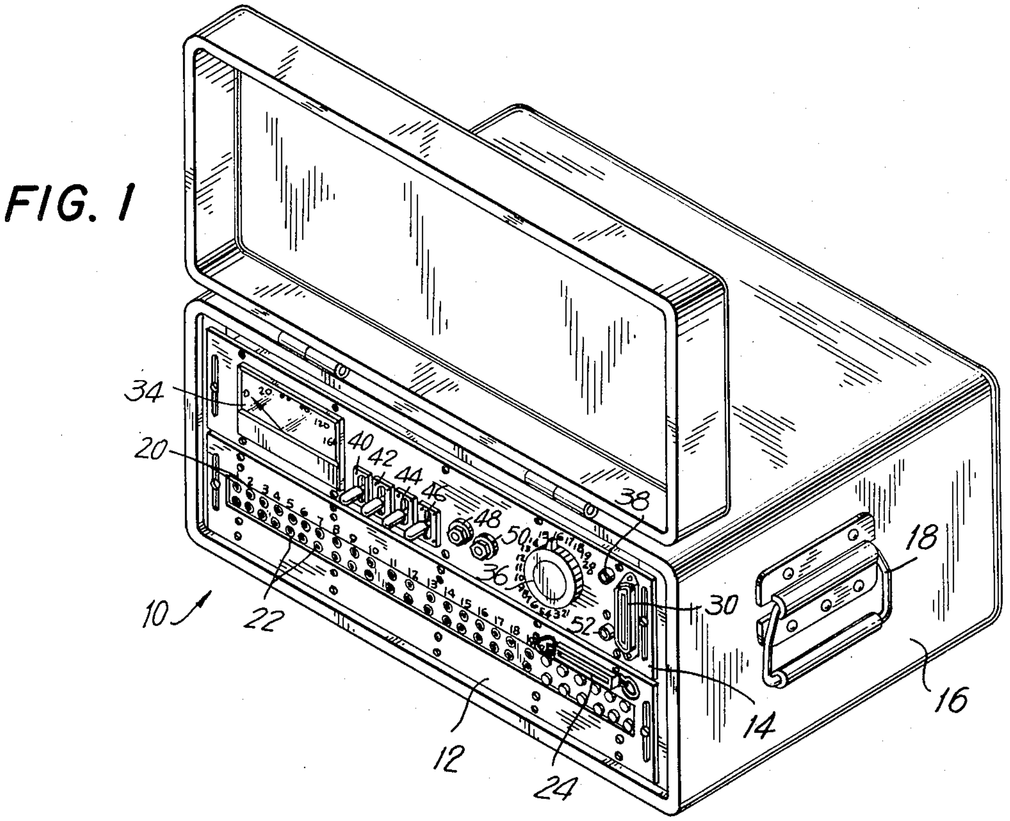
FIG. 1 is a perspective view of the component members of the OGT extender apparatus disposed within a portable carrying case and constructed pursuant to the principles of the present invention.

Referring now to the drawings, and more particularly to FIG. 1 thereof, there is depicted the OGT extender test and monitor apparatus generally designated by the reference numeral 10 and constructed in accordance with the principles of the present invention. The apparatus 10 comprises a trunk jack panel assembly 12 and a trunk test cabinet assembly 14. As seen in FIG. 1, in its stored or non-used position, the trunk jack panel assembly 10 and the trunk test cabinet assembly 12 are disposed within a portable carrying and protective case 16. The case 16 is provided with handles 18 so as to enable an individual to carry the entire OGT apparatus 10 to a desired location; i.e., the OGT test board.

Figure 2:
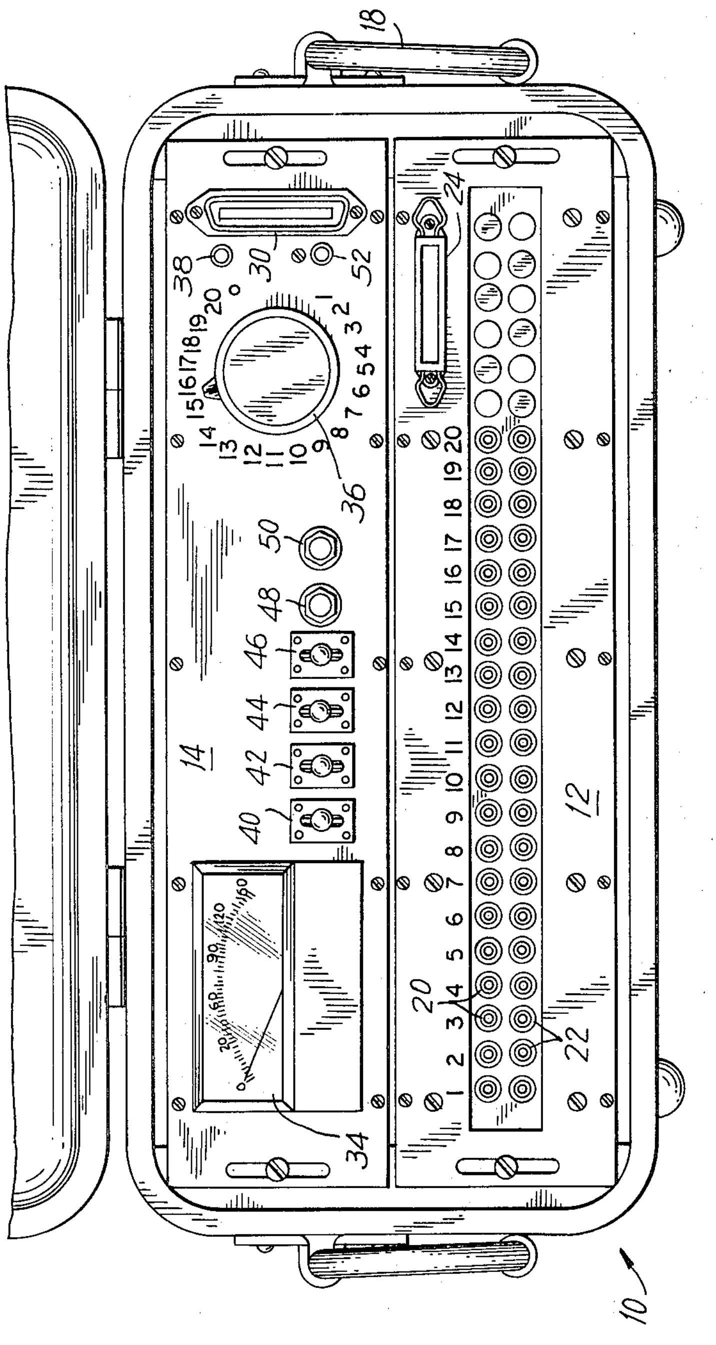
FIG. 2 is a front view of the component members depicted in FIG. 1.
Figure 4:
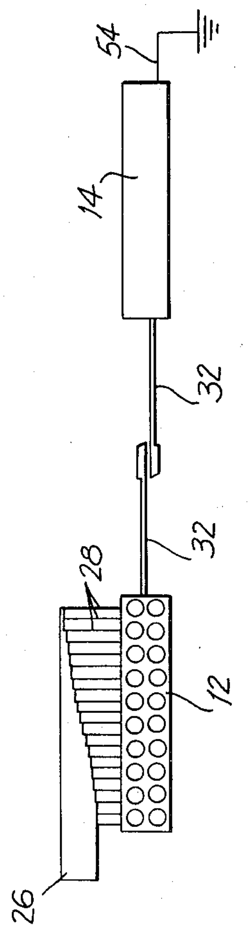
FIG. 4 is a basic electrical block diagram of the OGT extender apparatus in conjunction with the OGT test board.

As best seen in FIG. 2, the trunk jack panel 12 includes, in the preferred embodiment, 20 jacks of a type which are those associated with crossbar systems, and generally designated by the reference numeral 20; and 20 jacks of the type which are associated with the panel systems, and which are generally designated by the reference numeral 22. The trunk jack panel also includes an Amphenol connector 24 having a multiplicity of leads, not shown, which are connected to the jacks 20 and 22. The jack strip panel 12 is itself mounted directly to the OGT test board or to the bottom of the frame holding the test board and which is generally designated by the reference numeral 26 in FIG. 4. The individual trunks appearing at the OGT test board are connected to the individual jacks 20 or 22 of the trunk jack panel assembly 10 by means of Standard Western Electric Co. patch cords No. 3P16B which patch cords are designated by the reference numeral 28 in FIG. 4. The patch cords 28 have a first type of jack plug on one end thereof which is adaptable with jacks of the crossbar systems and jack plugs on the other end thereof which are compatible with jacks of the panel system. Thus, the jack strip panel assembly 12 is capable of use with either panel or crossbar systems by use of these type of patch cords, in the following manner. When the trunks on the OGT test board are of the crossbar system, the jack plugs of the crossbar type on the patch cords 28 are inserted therein and the other ends thereof for the panel system are plugged into the jacks 22 of the jack strip panel assembly 12. When the trunks on the OGT test board are of the panel system, then the patch cord orientation is reversed.

The trunk test cabinet assembly 14 is adapted to be positioned at a location remote from the OGT test board 26 and, in one embodiment of the invention, is mounted on a desk top. It is herein to be noted, that the trunk test cabinet assembly 14 may also be mounted on a remotely positioned rack.

The trunk test cabinet assembly 14 includes an Amphenol connector 30 which is the input connector to the assembly 14. The output connector 24 of the jack strip panel assembly 12 is connected to the input connector 30 of the trunk test cabinet assembly 14 by means of Western Electric No. B-60-A Amphenol ended connector cable designated by the reference numeral 32.

Figure 3:
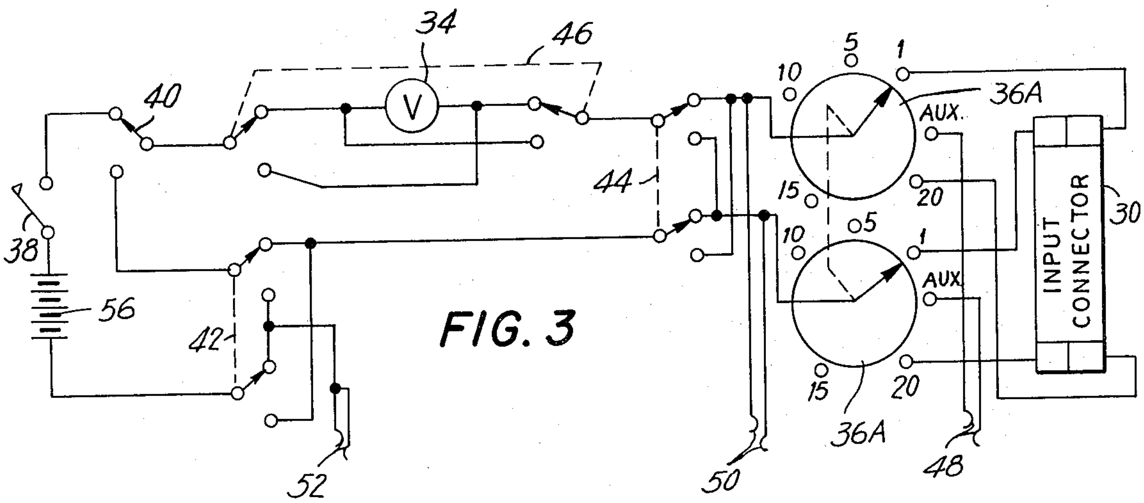
FIG. 3 is an electrical schematic representation of the trunk test cabinet component of the OGT extender of the OGT extender of the present invention.

Reference is now had to FIG. 2 and FIG. 3 jointly, so as to correlate the mechanical parts of the trunk test cabinet assembly 14 with its counterpart electrical representation. The assembly 14 includes a voltmeter 34, a selector switch 36, an on-off switch 38, a foreign electro-motive force switch 40, hereinafter referred to as FEMF switch, a ground switch 42, a reversing switch 44, a voltmeter reversing switch 46, an auxiliary jack 48, a tap jack 50 and a ground jack 52.

The ground jack 52 is connected by means of a ground patch cord 54 which is of the Western Electric No. 2W6A type, to the system ground. This insures that the ground potential appearing at the trunk test cabinet panel 14 is the same as that which appears at the OGT test board 26.

When it is desired to test the trunks, the operator activates the on-off switch 38 which places the potential of a batter 56 in the circuit. Thereafter, the operator selects one of twenty trunks which electrically appear at the assembly 14, by means of the selector switch 36. It is herein to be noted that the selector switch 36 actually comprises two separate components which are a tip selector switch 36A and a ring selector switch 36B, of course, these two component switches are ganged together, as illustrated in FIG. 3. The trunks are then tested by established test procedures requiring selective operation of the aforementioned switches 40, 42, 44 and 46. Since the testing procedure, per se, does not form part of the present invention, no detailed description with regard thereto is deemed to be necessary. However, it is to be noted that the auxiliary jack 48 permits for direct trunk testing from the test cabinet 14 to the OGT test board 26 while bypassing the other part of the OGT extender apparatus 10; i.e., the trunk jack panel 12 and the plurality of associated connector cords 28. Thus any singular one of the cords 28 may be directly interconnected between a selected trunk appearance at the test board 26 and the auxiliary jack 48 of the test cabinet 14. Additionally, the tap jack 50 permits other test equipment to be interfaced with the trunk test cabinet assembly 14 to provide for further testing of the trunks.

It is thus seen that the present invention provides an OGT extender apparatus which permits testing of trunks at positions which are remote from the OGT test board and whereby the test procedures can be performed with ease and simplicity.

While I have shown and described the preferred embodiment of the present invention, it will be apparent to those skilled in the art that there are many changes, modifications and improvements which may be made thereto without departing from the spirit and scope of the present invention.

What is claimed is:

1. A trunk extender test and monitor apparatus for central telephone equipment comprising;
- a trunk jack panel assembly, and
- a trunk test cabinet assembly,
- said trunk jack panel assembly comprising a plurality of jacks and a multi-terminal connector,
- each of said jacks being internally electrically connected to selected ones of the terminals of said multi-terminal connector, said trunk test cabinet assembly comprising
- a multi-terminal connector,
- selective switching means, and
- voltage measuring means,
- cable connecting means for interconnecting said multi-terminal connectors of said jack panel assembly and said trunk test cabinet assembly with said trunk test cabinet assembly being positionally disposed remotely from said jack panel assembly,
- said trunk jack panel assembly being adapted to be positioned in proximity of said central telephone equipment,
- each of said jacks of said trunk jack panel assembly being operable to have a trunk input from said central telephone equipment connected thereto, and
- said selective switching means of said trunk test cabinet assembly being operatively connected with said multi-terminal connector thereof to selectively connect each of the trunk appearances at said jack panel assembly to said trunk test cabinet assembly for test and monitoring procedures of said selected trunk remotely of its appearance at said central telephone equipment and said jack panel assembly.

2. A trunk extender test and monitor apparatus in accordance with claim 1, wherein said apparatus is an outgoing trunk extender apparatus for use in conjunction with outgoing trunk test frames of central telephone equipment.

3. A trunk extender test and monitor apparatus in accordance with claim 2, wherein
- each pair of jacks comprise a single input of said trunk jack panel assembly,
- one of said jacks of said pair being a crossbar system jack,
- the other of said jacks of said pair being a panel system jack, and
- said jacks being connected in parallel whereby a trunk input is selectively connected to one of said pair of jacks.

4. A trunk extender test and monitor apparatus in accordance with claim 3, wherein
- said selective switching means comprises a rotary switch member having a plurality of switching positions, and
- each of said switching positions corresponding to a preselected one of said jack inputs.

5. A trunk extender test and monitor apparatus in accordance with claim 4, wherein;
- said trunk test cabinet assembly includes a ground jack for correlating the ground potential thereat with that at said outgoing trunk test frame.

6. A trunk extender test and monitor apparatus in accordance with claim 4, wherein;
- said trunk test cabinet assembly includes an auxilliary jack for permitting direct connection of a selected trunk from said outgoing test frame thereto.

7. A trunk extender test and monitor apparatus in accordance with claim 4, wherein;
- said trunk test cabinet assembly includes a tap jack for providing a multiple or parallel appearance of the trunk selected by said rotary switch, and
- said tap jack being operative to permit additional test equipment to be connected to said selected trunk at said trunk test cabinet assembly position.

8. An outgoing trunk extender test and monitor apparatus for use in conjunction with outgoing test frames of central telephone equipment and comprising
- a trunk jack panel assembly, and
- a trunk test cabinet assembly,
- means for mounting said trunk jack panel assembly to said outgoing test frame,
- said trunk jack panel assembly having a plurality of input jacks,
- means for connecting a plurality of outgoing trunk lines at said outgoing test frames to said jack inputs of said trunk jack panel assembly, means for interconnecting said trunk jack panel assembly and said trunk test cabinet assembly with the latter being positioned remotely of said trunk jack panel assembly, said interconnection means including means for selectively connecting each of said trunk lines connected to said jack inputs to said trunk test cabinet assembly for monitoring and testing of said selected trunk line at a position which is remote from said trunk jack panel assembly and said outgoing test frame.

9. An outgoing trunk extender test and monitor apparatus in accordance with claim 8, wherein each pair of input jacks comprises a singular input of said trunk jack panel assembly, one of said jacks of said pair being a crossbar system jack, the other of said jacks of said pair being a panel system jack, and said jacks being connected in parallel whereby a trunk input is selectively connected to one of said pair of jacks.

10. An outgoing trunk extender test and monitor apparatus in accordance with claim 8, wherein said trunk test cabinet includes means providing a ground potential thereat which is equal to the ground potential present at said outgoing test frame.

11. An outgoing trunk extender test and monitor apparatus in accordance with claim 8, wherein said trunk test cabinet includes an auxilliary jack for permitting direct connection thereto of a selected trunk from said outgoing test frame.

12. An outgoing trunk extender test and monitor apparatus in accordance with claim 8, wherein said trunk test cabinet assembly includes a tap jack for providing a multiple or parallel appearance of said trunk selected by said selective connection means.

13. An outgoing trunk extender test and monitor apparatus in accordance with claim 12, wherein said selective connection means comprises a rotary switch member.

* * * * *